(12) United States Patent
Go

(10) Patent No.: US 9,616,510 B2
(45) Date of Patent: Apr. 11, 2017

(54) ELECTRIC SAW

(71) Applicant: Seung Seop Go, Seongnam-si (KR)

(72) Inventor: Seung Seop Go, Seongnam-si (KR)

( * ) Notice: Subject to any disclaimer, the term of this patent is extended or adjusted under 35 U.S.C. 154(b) by 61 days.

(21) Appl. No.: 14/556,948

(22) Filed: Dec. 1, 2014

(65) Prior Publication Data
US 2016/0151844 A1    Jun. 2, 2016

(51) Int. Cl.
   *B23D 51/12*    (2006.01)
   *B23D 51/16*    (2006.01)

(52) U.S. Cl.
   CPC .............. *B23D 51/16* (2013.01); *B23D 51/12* (2013.01)

(58) Field of Classification Search
   CPC ........ B23D 51/12; B23D 51/16; B23D 51/08; B23D 51/00
   See application file for complete search history.

(56) References Cited

U.S. PATENT DOCUMENTS 4,825,741 A * 5/1989 Wellington .......... B23D 49/007 74/110

* cited by examiner

*Primary Examiner* — Jonathan Riley
*Assistant Examiner* — Liang Dong
(74) *Attorney, Agent, or Firm* — Hamre, Schumann, Mueller & Larson, P.C.

(57) ABSTRACT

The present invention relates to an electric saw 1 including: a body 100; a base 200 fixing a frame 410 of an elevating motion converting part 400 thereto; a forward and reverse rotation driving part 300 adapted to drive forward and reverse rotation of a DC motor 320; the elevating motion converting unit 400 adapted to move up and down an elevator 440 insertedly coupled movable up and down to left and right guides 412 and 412' of the frame 410; and a saw part 500 having a 'C'-shaped saw frame 510 having a fixing frame 510-1 adapted to fix one end of an upper frame 510-2 to the upper end thereof and to fix one end of a lower frame 510-3 to the lower end thereof and a plurality of elevator coupling holes 510-11 formed on the intermediate area thereof, the upper frame 510-2 adapted to fix the upper end of a saw blade 520 to the other end thereof, and the lower frame 510-3 adapted to fix the lower end of the saw blade 520 to the other end thereof, and the saw blade 520 fixed on both ends thereof to the other end of the upper frame 510-2 and to the other end of the lower frame 510-3.

12 Claims, 10 Drawing Sheets

ELECTRIC SAW

BACKGROUND OF THE INVENTION

Field of the Invention

The present invention relates to an electric saw, and more particularly, to an electric saw wherein if a DC motor rotates forwardly and reversely by means of relay (switch contact is disconnected or connected by electrical signals) of relay switches in accordance with the signals sensed by sensors upon the application of power to allow a wheel coupled to the motor shaft of the DC motor to rotate forwardly and reversely, a wire tied up on both ends thereof to the wheel is guided by wire grooves formed on the periphery of the wheel and turned around upper and lower rollers, thus moving up and down an elevator coupled to guides formed on the front surface of a frame to allow a saw part coupled to the elevator to be moved up and down to cut a target object.

Background of the Related Art

In daily living, small and large building is needed. This is one of people's demands for possessing their unique object made with their desired design and size at low expenses, while utilizing their free time. Accordingly, people enjoying DIY (Do It Yourself) in making, repairing and decorating household goods have been recently increased. If it is desired to make a given workpiece with a worker's hands, materials needed in making the workpiece should be cut to given sizes, which is very important to make the workpiece.

A conventional saw is very useful to cut a piece of wood or to cut a target object in a long linear line, but so as to use the conventional saw, a physical force has to be applied. Besides, high skill has to be required to obtain a smooth cut surface through the conventional saw.

However, it is a little difficult for women or young adults to purchase and handle a high-priced electric circular saw, and further, the electric circular saw generates high noise upon cutting. Furthermore, the electric circular saw is not useful to cut a material like metal or synthetic resin except wood, and it is very hard to cut a cutting surface at an oblique angle.

Especially, the electric circular saw does not easily cut the target object along a curved line, and further, it is very difficult to incise the center area of the target object to a given shape.

SUMMARY OF THE INVENTION

Accordingly, the present invention has been made in view of the above-mentioned problems occurring in the prior art, and it is an object of the present invention to provide an electric saw that allows women or young adults to cut a target object safely and easily, generates low noise upon cutting, is useful to cut a material like metal or synthetic resin as well as wood, cuts a cutting surface at an oblique angle if necessary, easily cuts the target object along a curved line, and incises the center area of the target object to a given shape.

To accomplish the above-mentioned object, according to the present invention, there is provided an electric saw including: a body; a base fixedly coupled to the center of traverse stands of the body to fix a frame of an elevating motion converting part thereto; a forward and reverse rotation driving part adapted to drive forward and reverse rotation of a DC motor under the control of first and second relay switches alternately connected by means of upper and lower sensors; the elevating motion converting unit adapted to allow a wire wound on a wheel to be turned around upper and lower rollers and to move up and down an elevator insertedly coupled movable up and down to left and right guides of the frame, when the wheel coupled to a motor shaft of the DC motor rotates forwardly and reversely according to the forward and reverse rotation of the DC motor; and a saw part having a 'C'-like shaped saw frame having a fixing frame adapted to fix one end of an upper frame to the upper end thereof and to fix one end of a lower frame to the lower end thereof and a plurality of elevator coupling holes formed on the intermediate area thereof, the upper frame adapted to fix the upper end of a saw blade to the other end thereof, and the lower frame adapted to fix the lower end of the saw blade to the other end thereof, and the saw blade fixed on both ends thereof to the other end of the upper frame and to the other end of the lower frame.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
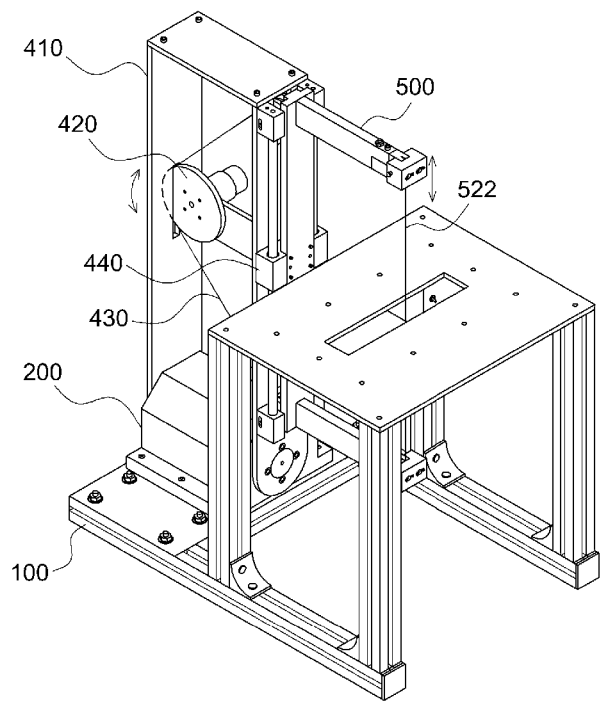
FIG. 1 is a perspective view showing an electric saw according to a first embodiment of the present invention.

Hereinafter, an explanation on a configuration and an operating effect of an electric saw according to the present invention will be in detail given with reference to the attached drawing.

Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

Figure 2:
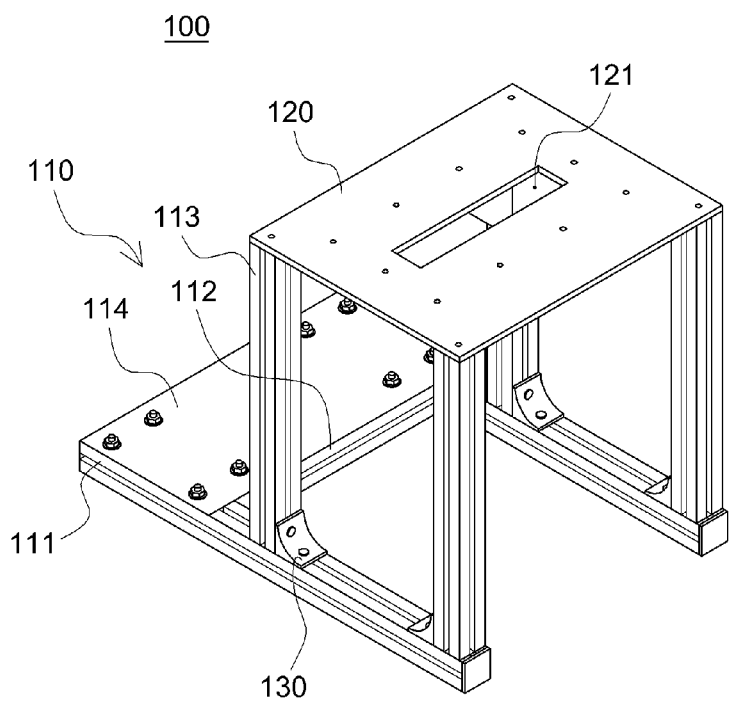
FIG. 2 is a perspective view showing a body of the electric saw according to the first embodiment of the present invention.
Figure 3:
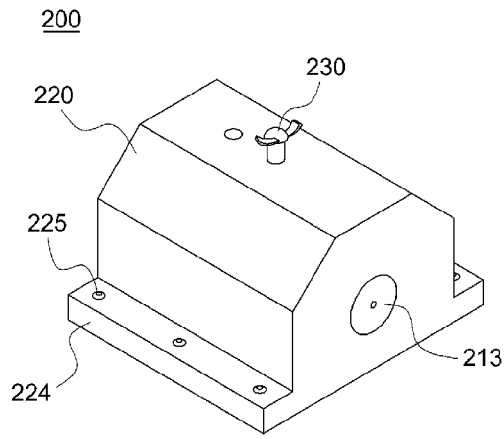
FIGS. 3 to 5 are perspective and side sectional views showing a base of the electric saw according to the first embodiment of the present invention.
Figure 4:
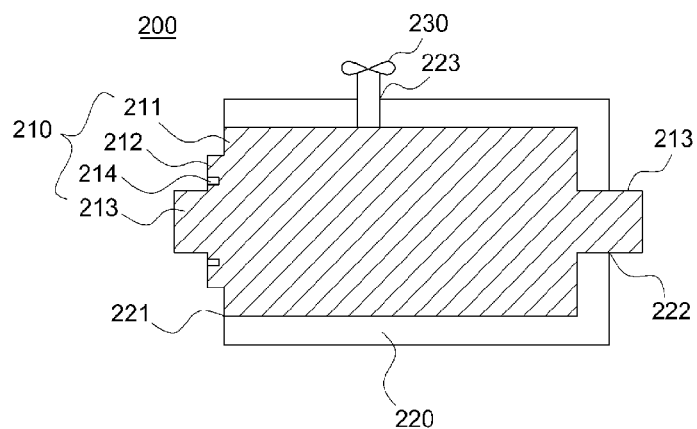
Figure 5:
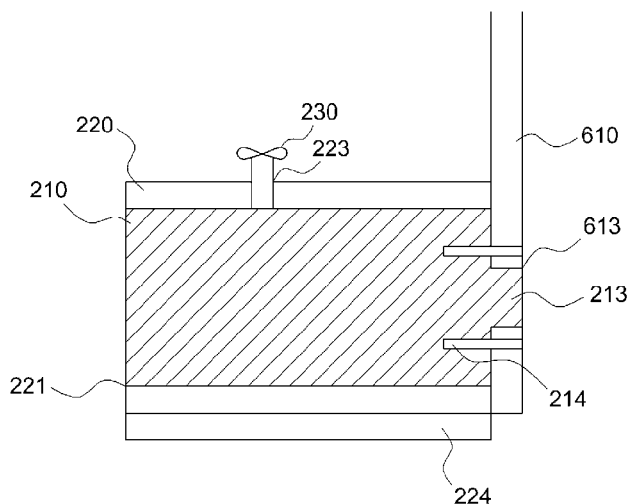
Figure 6:
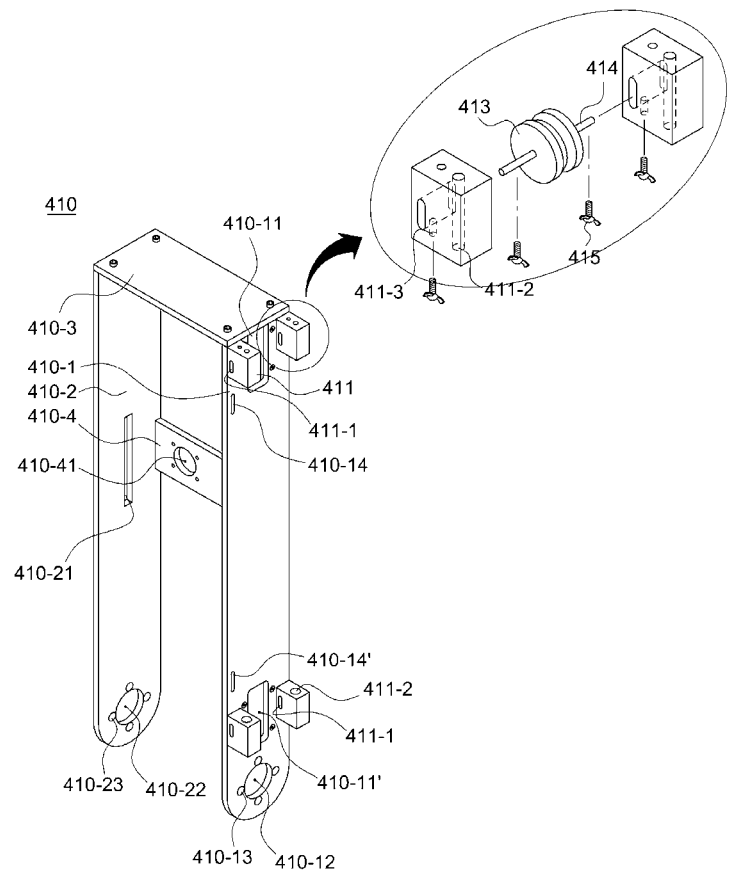
FIG. 6 is an exploded perspective view showing a frame of the electric saw according to the first embodiment of the present invention.
Figure 7:
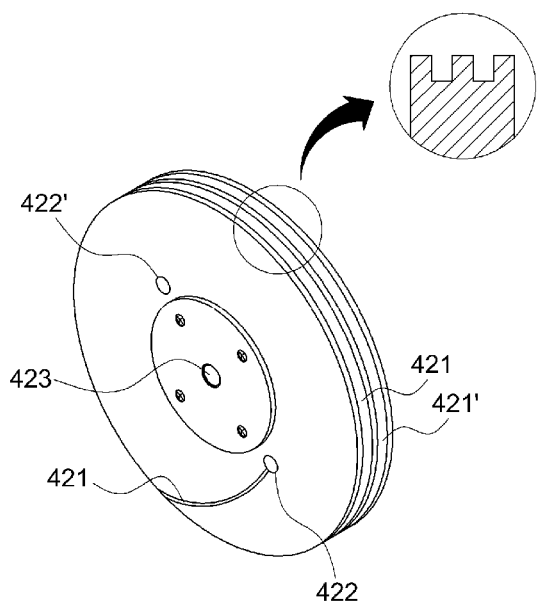
FIGS. 7 and 8 are perspective views showing a wheel of the electric saw according to the first embodiment of the present invention.
Figure 8:
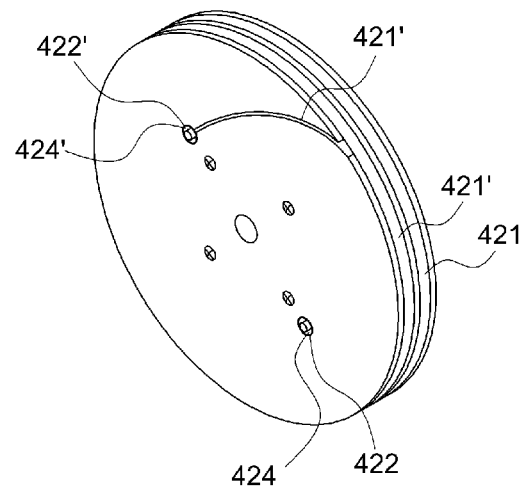
Figure 9:
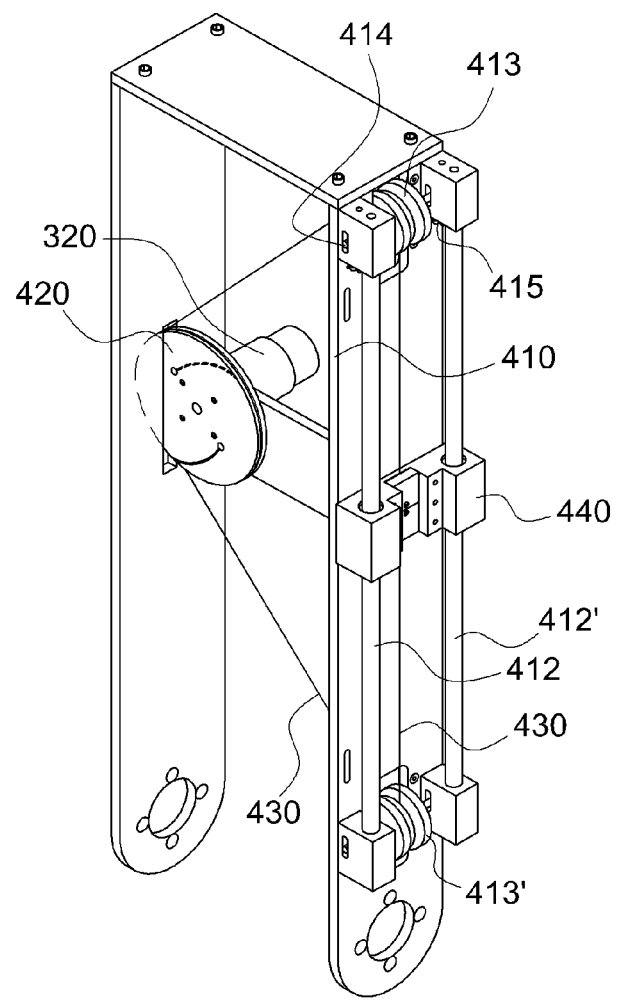
FIG. 9 is a perspective view showing the main parts of the electric saw according to the first embodiment of the present invention.
Figure 10:
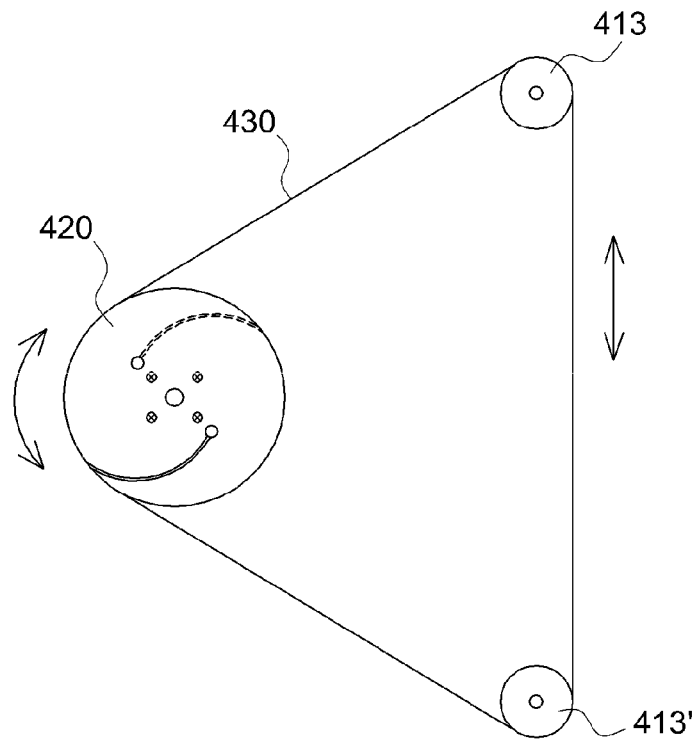
FIG. 10 is a schematic view showing the conversion of the forward and reverse motion of a DC motor into an elevating motion of an elevator.
Figure 11:
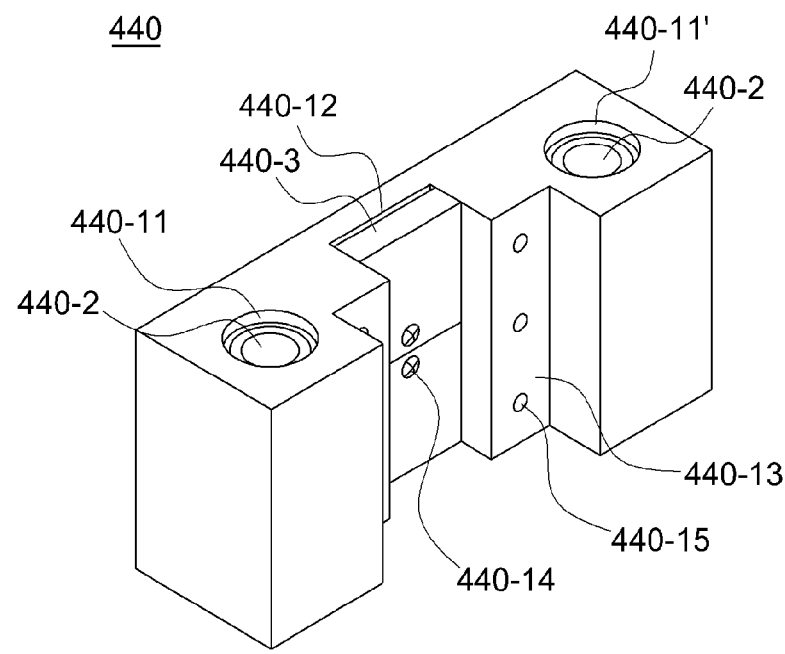
FIGS. 11 to 13 are perspective views showing various examples of the elevator.
Figure 12:
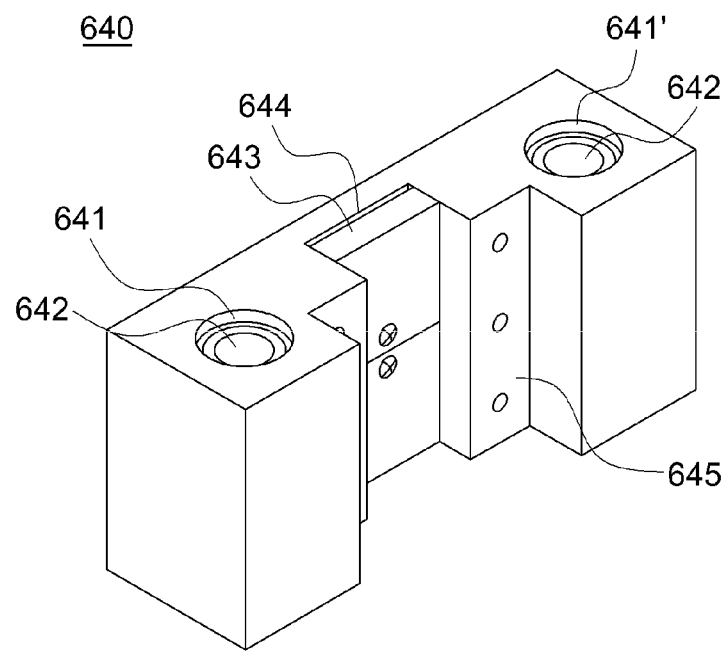
Figure 13:
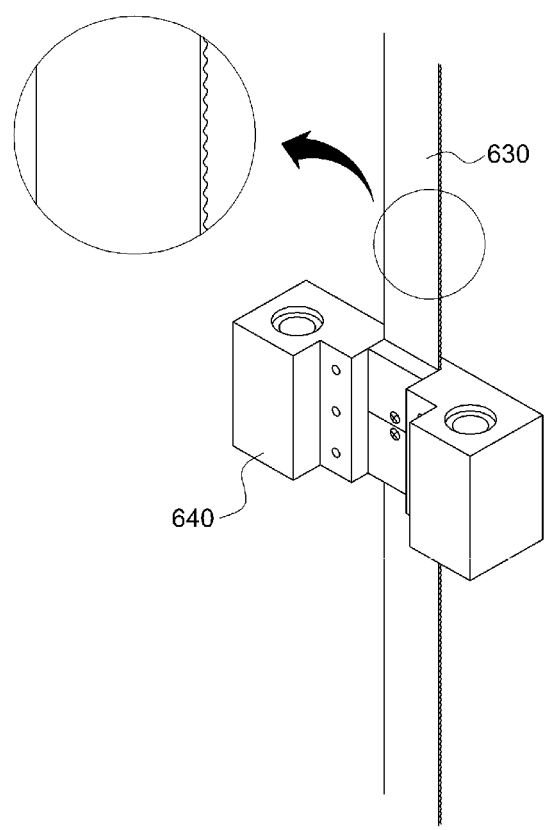
Figure 14:
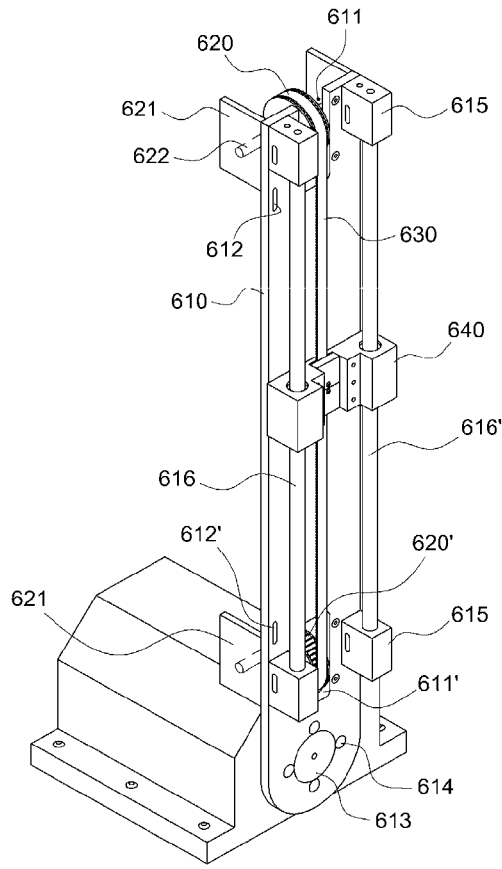
FIG. 14 is a perspective view showing an electric saw having a timing belt according to a second embodiment of the present invention.

FIG. 1 is a perspective view showing an electric saw according to a first embodiment of the present invention, FIG. 2 is a perspective view showing a body of the electric saw; FIGS. 3 to 5 are perspective and side sectional views showing a base of the electric saw, FIG. 6 is an exploded perspective view showing a frame of the electric saw, FIGS. 7 and 8 are perspective views showing a wheel of the electric saw, FIG. 9 is a perspective view showing the main parts of the electric saw, FIG. 10 is a schematic view showing the conversion of the forward and reverse motion of a DC motor into an elevating motion of an elevator, FIGS. 11 to 13 are perspective views showing various examples of the elevator, FIG. 14 is a perspective view showing an electric saw having a timing belt according to a second embodiment of the present invention, FIGS. 15 to 20 are perspective views showing various examples of a saw part in the electric saw according to the present invention, and FIG. 21 is a diagram showing a forward and reverse rotation driving part in the electric saw according to the present invention.

As shown in FIGS. 1 to 21, an electric saw 1 according to a first embodiment of the present invention includes: a body 100; a base 200 fixedly coupled to the center of traverse stands 112 of the body 100 to fix a frame 410 of an elevating motion converting part 400 thereto; a forward and reverse rotation driving part 300 adapted to drive forward and reverse rotation of a DC motor 320 under the control of first and second relay switches 340 and 340' alternately connected by means of upper and lower sensors 330 and 330'; the elevating motion converting unit 400 adapted to allow a wire 430 wound on a wheel 420 to be turned around upper and lower rollers 413 and 413' and to move up and down an elevator 440 insertedly coupled movable up and down to left and right guides 412 and 412' of the frame 410, when the wheel 420 coupled to a motor shaft of the DC motor 320 rotates forwardly and reversely according to the forward and reverse rotation of the DC motor 320; and a saw part 500 having a 'C'-like shaped saw frame 510 having a fixing frame 510-1 adapted to fix one end of an upper frame 510-2 to the upper end thereof and to fix one end of a lower frame 510-3 to the lower end thereof and a plurality of elevator coupling holes 510-11 formed on the intermediate area thereof, the upper frame 510-2 adapted to fix the upper end of a saw blade 520 to the other end thereof, and the lower frame 510-3 adapted to fix the lower end of the saw blade 520 to the other end thereof, and the saw blade 520 fixed on both ends thereof to the other end of the upper frame 510-2 and to the other end of the lower frame 510-3.

Hereinafter, the configuration of the electric saw according to the present invention will be in detail explained.

First, the body 100 is formed of a square aluminum profile frame, and as shown in FIG. 2, the body 100 includes: a frame 110 having two horizontal stands 111 stably installed in parallel to each other to maintain the balance and to prevent overturning, the traverse stands 112 coupled traversely to the rear side portions of the horizontal stands 111 to fix the base 200 thereto, four vertical stands 113 coupled vertically to the front side portions of the horizontal stands 111 by means of bolt coupling of brackets 130 to fix a top panel 120 thereto; and the top panel (working plate) 120 coupled horizontally to the top ends of the four vertical stands 113.

The top panel 120 has a through hole formed on the center thereof, through which the saw blade 520 is moved up and down, and in this case, the through hole is desirably formed of a horizontal long hole 121 to fix the frame 410 at an oblique angle and to cut a target object at the oblique angle.

The base 200 is fixed to the center of the traverse stands 112, and a safety panel 114 is disposed on the top of the traverse stands 112.

The top panel 120 fixed horizontally to the top ends of the four vertical stands 113 has a generally square shape, but the shape of the top panel 120 is freely determined, without any limitation thereto.

Next, as shown in FIGS. 3 and 4, the base 200 includes: a rotary body 210 adapted to fix the lower end portion of the frame 410 of the elevating motion converting part 400 thereto; a housing 220 adapted to rotatably accommodate the rotary body 210 into a hollow portion 221 formed at the inside thereof; and a wing bolt 230 adapted to adjust a fixing angle of the rotary body 210, and the base 200 is fixedly coupled to the traverse stands 112.

The rotary body 210 is formed of a steel rod body and has a coupling end 212 formed on one end thereof in such a manner as to have a smaller diameter than a diameter of a body 211 and shafts 213 having given diameters disposed on the center of the coupling end 212 and on the center of the other end thereof.

At this time, the shafts 213 have the corresponding diameters to shaft coupling holes 410-12 and 410-22 formed on the lower ends of front and rear frames 410-1 and 410-2 of the elevating motion converting part 400.

The rotary body 210 is inserted into the hollow portion 221 of the housing 220 in such a manner as to allow the other end shaft 213 to be rotatably coupled to a shaft hole 222 of the housing 220.

The coupling end 212 has a plurality of coupling holes 214 formed at given positions along the section thereof.

The coupling end 212 of the rotary body 210 is coupled to the lower end portion of the front frame 410-1 of the elevating motion converting part 400.

Further, the housing 220 is made of aluminum ingot as a weight by means of machining to lower the center of weight of the electric saw 1, and as shown in FIGS. 3 and 4, the housing 220 includes the hollow portion 221 formed on one surface thereof in such a manner as to be open to a given depth, the shaft hole 222 having a given diameter formed on the center of the other surface thereof, a control hole 223 formed on the top surface thereof, and wings 224 formed on both sides of the lower end thereof and having a plurality of coupling holes 225 piercedly formed thereon in such a manner as to be fastened to coupling bolts.

The wing bolt 230 is mounted on the control hole 223 to prevent the rotary body 210 accommodated into the housing 220 from being arbitrarily rotated.

Further, as shown in FIGS. 9 and 21, the forward and reverse rotation driving part 300 includes: an adapter 310 supplying 24V current; the DC motor 320 coupled to the outer surface of a motor coupling panel 410-4 and having a motor shaft protruding from the inner surface of the motor coupling panel 410-4; the upper and lower sensors 330 and 330' sensing the appearance of the elevator 440 at given upper and lower positions; and the first and second relay switches 340 and 340' rotating the DC motor 320 forwardly and reversely through the sensing of the upper and lower sensors 330 and 330'.

That is, as shown in FIG. 21, the electric saw 1 according to the present invention includes a power part P1, a sensor part P2, a relay part P3 and an operating part P4, and the relay part P3 of the forward and reverse rotation driving part 300 includes the first relay switch 340 converting a signal in response to the detected values from the sensors and the second relay switch 340' converting the power applied to the DC motor 320 in accordance with the values of the first relay switch 340.

The adapter 310, the DC motor 320 and the first and second relay switches 340 and 340' are mounted on given positions of the body 100 and the frame 410 and electrically connected to the upper and lower sensors 330 and 330' coupled to upper and lower sensor coupling holes 410-14 and 410-14' of the front frame 410-1.

When power is supplied, the DC motor 320 rotates forwardly and reversely in accordance with the contact control of the first and second relay switches 340 and 340' by the signals sensed by the upper and lower sensors 330 and 330'.

At this time, the upper sensor 330 senses the appearance of the uppermost end of the elevator 440 moving up, and the lower sensor 330' senses the appearance of the lowermost end of the elevator 440 moving down.

Further, as shown in FIGS. 6 and 9, the elevating motion converting unit 400 includes: the frame 410 having the front frame 410-1 having fixing blocks 411 fixed to both sides of the upper and lower portions of the front surface thereof and the rear frame 410-2 located behind the front frame 410-1 in such a manner as to be connected on the top portion thereof to the front frame 410-1 by means of a top frame 410-3 and connected on the intermediate portion thereof to the front frame 410-1 by means of the motor coupling panel 410-4, the front frame 410-1 and the rear frame 410-2 being formed unitarily with each other; the wheel 420 coupled to the motor shaft protruding from the other side of the motor coupling panel 410-4 by means of at least one or more bolts; the wire 430 tied up to the wheel 420 in such a manner as to be turned around the upper and lower rollers 413 and 413' and to fix the elevator 440 thereto; and the elevator 440 insertedly coupled movable up and down to the left and right guides 412 and 412' fixed to the front surface of the front frame 410-1 in such a manner as to be fixed to the wire 430.

In more detail, the frame 410 is formed of an aluminum panel, and as shown in FIG. 6, the frame 410 includes the front frame 410-1 and the rear frame 410-2 formed unitarily with each other. The front frame 410-1 has the fixing blocks 411 fixed to both sides of the upper and lower portions of the front surface thereof, and the rear frame 410-2 is located behind the front frame 410-1 in such a manner as to be connected on the top portion thereof to the front frame 410-1 by means of the top frame 410-3 and connected on the intermediate portion thereof to the front frame 410-1 by means of the motor coupling panel 410-4.

The front frame 410-1 includes: upper and lower roller protruding holes 410-11 and 410-11' formed on the top end portion and the lower portion thereof; the shaft coupling hole 410-12 formed on the lower end portion thereof; a plurality of frame coupling holes 410-13 formed along the periphery of the shaft coupling hole 410-12; and the upper and lower sensor coupling holes 410-14 and 410-14' formed on given positions of the upper and lower portions thereof.

The front frame 410-1 has one pair of fixing blocks 411 fixed to the left and right sides of the upper portion thereof, and the fixing blocks 411 are formed symmetrically on left and right sides and have roller shaft coupling holes 411-1 formed on the inner surfaces thereof to face each other and guide coupling holes 411-2 and fine adjusting screw coupling holes 411-3 formed on the underside thereof. Further, the front frame 410-1 has one pair of fixing blocks 411 fixed to the left and right sides of the lower portion thereof, and the fixing blocks 411 are symmetrical up and down with respect to one pair of fixing blocks 411 formed on the upper portion thereof.

As shown in FIG. 9, the upper and lower rollers 413 and 413' are coupled horizontally to the roller shaft coupling holes 411-1 of the upper and lower fixing blocks 411, and the left and right guides 412 and 412' are fixed up and down to the guide coupling holes 411-2 of the upper and lower fixing blocks 411.

At this time, as shown in FIG. 6, fine adjusting screws 415 are disposed in the fine adjusting screw coupling holes 411-3 of the upper and lower fixing blocks 411 to finely adjust the coupling positions of roller shafts 414 and 414' of the upper and lower rollers 413 and 413' and to adjust the tension of the wire 430.

Further, the rear frame 410-2 has the shaft coupling hole 410-22 piercedly formed on the lower end portion thereof and a plurality of frame coupling holes 410-23 piercedly formed along the periphery of the shaft coupling hole 410-22 in such a manner as to be fastened to coupling bolts.

As the radius of the wheel 420 is increased, the torque of the DC motor 320 becomes high, and accordingly, the rear frame 410-2 desirably has a wheel protruding hole 410-21 formed on the intermediate area thereof to exchange the wheel 420 therethrough.

The motor coupling panel 410-4 has a motor shaft protruding hole 410-41 piercedly formed on the intermediate area thereof.

Under the above-mentioned configuration of the frame 410, the front frame 410-1 is fixed on the lower end portion thereof to the coupling end 212 of the rotary body 210 of the base 200 fixed to the body 100, and the lower frame 410-2 is coupled rotatably to the shaft 213 formed on the other end of the rotary body 210 on the lower end portion thereof. Accordingly, the frame 410 is inclined to an oblique angle, and if the rotary body 210 is fixed by means of the wing bolt 230, the surface of a target object to be cut can be cut at the oblique angle. At this time, desirably, a reference point is indicated on the lower end portion of the front frame 410-1, and a protractor is indicated on one surface of the traverse stands 112.

At this time, the frame 410 may include the front frame 410-1 and a frame support panel coupled to the back surface of the front frame 410-1 to reinforce the supporting force against the front frame 410-1, without having any rear frame 410-2 and top frame 410-3, and in this case, the frame support panel is coupled to the motor coupling panel 410-4.

Next, as shown in FIGS. 7 and 8, the wheel 420 has a shape of a disc and includes two wire grooves 421 and 421' formed in parallel to each other along the periphery thereof in such a manner as to be extended to two wire knot holes 422 and 422' formed on a body thereof along the respective peripheral surfaces thereof and knot rods 424 and 424' disposed on the wire knot holes 422 and 422'.

The wheel 420 is fastened to the motor shaft protruding from the inner surface of the motor coupling panel 410-4 by means of the plurality of coupling bolts.

Further, as shown in FIGS. 7 to 9, the wire 430 is tied up on both ends thereof to the knot rods 424 and 424' disposed on the wire knot holes 422 and 422' formed on the body of the wheel 420, so that one end wire is turned around the upper roller 413 and the other end wire is turned around the lower roller 413' along the respective wire grooves 421 and 421' at the same time, thus fixedly coupling the elevator 440 coupled movable up and down to the left and right guides 412 and 412' fixed to the front surface of the front frame 410-1 thereto.

If the wheel 420 rotates forwardly and reversely, accordingly, one end wire 430 pulls and the other end wire 430 is unwound, which is repeatedly conducted, so that as shown in FIG. 10, the wire 430 is turned around the upper and lower rollers 413 and 413' to allow the forward and reverse rotation to be converted into elevating motions, thus moving the elevator 440 up and down.

The elevator 440 has a shape of a block made of an aluminum material, and as shown in FIG. 11, the elevator 440 includes left and right linear bearing coupling holes 440-11 and 440-11' piercedly formed on the top and underside thereof and linear bearings 440-2 insertedly coupled to the left and right linear bearing coupling holes 440-11 and 440-11' in such a manner as to maintain air tight states, while having a flat rear surface and a stepped front surface formed by means of machining to have a wire fixing piece accommodating portion 440-12 accommodating a wire fixing piece 440-3 into which the wire 430 is fixed thereinto and a fixing frame accommodating portion 440-13 formed to accommodate the fixing rod 510-1 of the saw frame 510 thereinto.

The elevator 440 is insertedly coupled movable up and down to the left and right guides 412 and 412' fixed to the front surface of the front frame 410-1 in such a manner as to be fixed to the wire 430, so that it is moved up and down by means of the forward and reverse rotation of the DC motor 320.

That is, if the wheel 420 coupled to the motor shaft of the DC motor 320 is rotated forwardly and reversely in accordance with the forward and reverse rotation of the DC motor 320, as shown in FIGS. 9 and 10, the wire 430 whose both ends are tied up to the body of the wheel 420 is guided along the wire grooves 421 and 421' formed on the periphery of the body of the wheel 420, so that one end wire 430 is turned around the upper roller 413 and the other end wire 430 is turned around the lower roller 413', while being pulled and unwound at the same time to move the elevator 440 up and down.

The fixing frame accommodating portion 440-13 of the elevator 440 is coupled to the fixing rod 510-1 of the saw frame 510 by means of a plurality of coupling bolts.

On the other hand, the elevating motion converting part 400 may be configured with a timing belt.

That is, as shown in FIGS. 12 to 14, an elevating motion converting part 600 according to a second embodiment of the present invention includes a frame 610, upper and lower belt pulleys 620 and 620', a timing belt 630 and an elevator 640.

At this time, the frame 610, which has a shape of a panel, includes: upper and lower roller protruding holes 611 and 611' formed on the top end portion and the lower portion thereof; upper and lower sensor coupling holes 612 and 612' formed on given positions of the upper and lower portions thereof; a shaft coupling hole 613 formed on the lower end portion thereof; a plurality of frame coupling holes 614 formed along the periphery of the shaft coupling hole 613; and guide fixing members 615 fixed to the left and right sides of the upper and lower portions of the front surface thereof.

Further, left and right guides 616 and 616' insertedly coupled movable up and down to the elevator 640 are fixed to the guide fixing members 615 fixed to the left and right sides of the upper and lower portions of the front surface thereof.

Furthermore, the frame 610 has pulley fixing walls 621 coupled to the upper and lower portions of the back surface thereof in such a manner as to have pulley coupling holes 622 formed on the center thereof, and the upper and lower belt pulleys 620 and 620' are coupled rotatably to the pulley coupling holes 622 of the upper and lower pulley fixing walls 621 in such a manner as to protrude from the front surface of the frame 610.

The timing belt 630 has equally spaced grooves formed on the inner surface thereof in such a manner as to be accurately engaged with grooves formed on the upper and lower belt pulleys 620 and 620'.

As shown in FIGS. 13 and 14, both ends of the timing belt 630 are fixed to the elevator 640 coupled movable up and down to the guides 616 and 616' fixed to the front surface of the frame 610.

At this time, as shown in FIG. 5, the rotary body 210 is formed of a steel rod body and has one end having the same surface as the open portion of the housing 220 and the other end having the shaft 213 having a given diameter formed on the center thereof, the shaft 213 being coupled to the shaft coupling hole 613 formed on the lower end portion of the frame 610.

Accordingly, the shaft 213 has the corresponding diameter to the shaft coupling hole 613 of the frame 610. The rotary body 210 is inserted into the hollow portion 221 of the housing 220. The rotary body 210 has the plurality of coupling holes 214 formed at given positions along the section of the other end thereof.

Further, at this time, the housing 220 is made of aluminum ingot as a weight by means of machining to lower the center of weight of the electric saw 1, and as shown in FIG. 5, the housing 220 is open on both surfaces thereof and includes the control hole 223 formed on the top portion thereof and the wings 224 formed on both sides of the lower end thereof and having the plurality of coupling holes 225 piercedly formed thereon in such a manner as to be fastened to coupling bolts. The wing bolt 230 is mounted on the control hole 223 to prevent the rotary body 210 accommodated into the housing 220 from being arbitrarily rotated.

On the other hand, at this time, the elevator 640 has a shape of a block made of an aluminum material, and as shown in FIG. 12, the elevator 640 includes left and right linear bearing coupling holes 641 and 641' piercedly formed on the top and underside thereof and linear bearings 642 insertedly coupled to the left and right linear bearing coupling holes 641 and 641' in such a manner as to maintain air tight states, while having a flat rear surface and a stepped front surface formed by means of machining to have a timing belt fixing piece accommodating portion 644 accommodating a timing belt fixing piece 643 into which both ends of the timing belt 630 are fixed thereinto and a fixing frame accommodating portion 645 formed to accommodate the fixing rod 510-1 of the saw frame 510 thereinto on the front surface thereof.

At this time, the motor shaft of the DC motor 320 is coupled to the lower belt pulley 620', and if the lower belt pulley 620' is rotated forwardly and reversely in accordance with the forward and reverse rotation of the DC motor 320, the timing belt 630 coupled to the upper and lower belt pulleys 620 and 620' is rotated forwardly and reversely to allow the elevator 640 to be moved up and down, which provides the same effects as mentioned in the first embodiment of the present invention.

The elevating motion converting part 600 according to the second embodiment of the present invention is more preferable in making the electrical saw 1 simple in the mechanical structure thereof.

On the other hand, the saw part 500 includes the saw frame 510 and the saw blade 520 formed integrally with each other by means of bolt fastening.

Generally, the saw blade 520 for cutting a target object in a working process includes a hacksaw blade 521 and a fretsaw blade 522. First, and as shown in FIGS. 15 to 18, the configuration of the saw frame 510 will be explained, and next, the configuration of the saw frame 510 wherein the fretsaw blade 522 is employed will be explained with reference to FIGS. 19 and 20.

Figure 15:
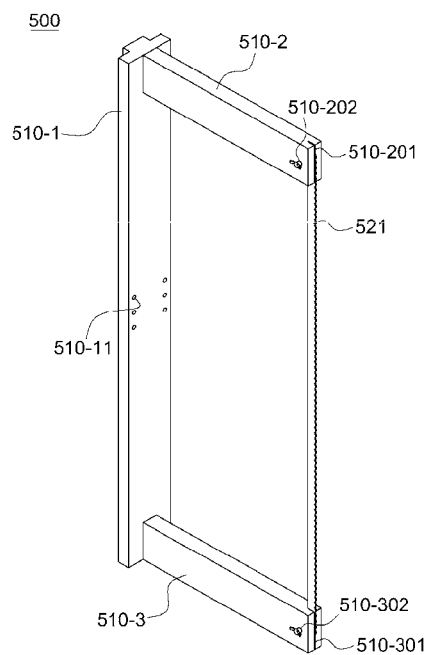
FIGS. 15 to 20 are perspective views showing various examples of a saw part in the electric saw according to the present invention.

As shown in FIG. 15, the saw frame 510 has a 'C'-like shape, which is formed unitarily with the fixing frame 510-1 fixedly coupled on the intermediate area thereof to the fixing frame accommodating portion 440-13 of the elevator 440, the upper frame 510-2 coupled on one end thereof to the top end of the fixing frame 510-1 and fixing the top end of the hacksaw blade 521 to the other end thereof, and the lower frame 510-3 coupled on one end thereof to the lower end of the fixing frame 510-1 and fixing the lower end of the hacksaw blade 521 to the other end thereof.

The hacksaw blade 521 is fixedly coupled to the other end of the upper frame 510-2 of the saw frame 510 and to the other end of the lower frame 510-3 of the saw frame 510 by means of coupling bolts fastened to pin holes formed on both ends thereof.

The fixing frame 510-1 of the saw frame 510 has the plurality of elevator coupling holes 510-11 formed in a form of nuts on the intermediate area thereof and coupling bolts for coupling the plurality of elevator coupling holes 510-11 thereto.

Accordingly, the back surface of the fixing frame 510-1 desirably has a corresponding shape to the fixing frame accommodating portion 440-13 of the elevator 440 in such a manner as to be seated in the fixing frame accommodating portion 440-13.

The upper frame 510-2 and the lower frame 510-3 have saw blade grooves 510-201 and 510-301 formed vertically on the other end thereof and coupling holes 510-202 and 510-302 piercedly formed on both side surfaces thereof in such a manner as to be fastened by means of coupling bolts.

On the other hand, as shown in FIGS. 16 to 20, the upper frame 510-2 may be separated into a body 510-21 and a coupling body 510-22 so as to achieve gentle tension adjustment and exchanging of the saw blade 520.

At this time, the body 510-21 is cut by a given width to a shape of a rectangular parallelepiped on the lower portion of one end thereof and includes a fastening bolt 510-212 disposed on the top portion thereof and a guide groove 510-214 formed vertically on the center of a cut wall 510-213 formed by the cutting. When the lower portion of one end of the body 510-21 is cut by the width of ½ to ⅔ or less of the thickness of the body 510-21 to the shape of the rectangular parallelepiped, the space for adjusting the tension of the saw blade 520 can be sufficiently formed.

Figure 16:
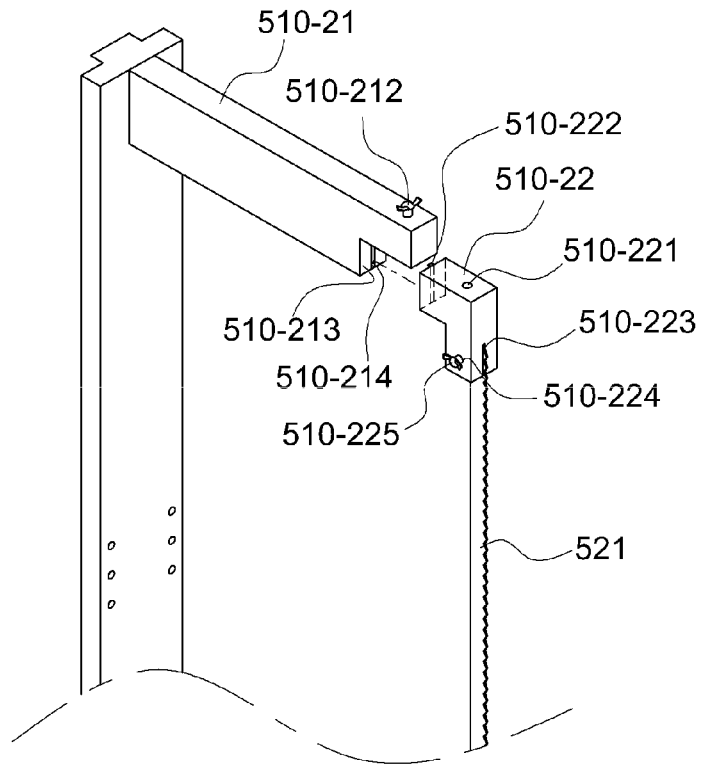

According to a first example of the coupling body 510-22, as shown in FIG. 16, the coupling body 510-22 has an upside down 'L'-like shape from a side of the coupling body 510-22 and includes a fastening hole 510-221 formed on the top portion thereof, a guide bar 510-222 formed on one surface contacted with the cut wall 510-213 of the body 510-21 in such a manner as to be inserted into the guide groove 510-214 of the cut wall 510-213, a saw blade groove 223 formed on the other surface thereof, and a coupling hole 510-224 piercedly formed on both side surfaces thereof in such a manner as to be fastened to coupling bolts 510-225.

If the fastening bolt 510-212 is fastened to the fastening hole of the body 510-21 and the fastening hole 510-221 of the coupling body 510-22, the upward and downward movements of the coupling body 510-22 are guided by means of the guide bar 510-222 slidingly moving along the guide groove 510-214, and the tension of the hacksaw blade 521 is adjusted in accordance with the degree of fastening of the fastening bolt 510-212.

Figure 17:
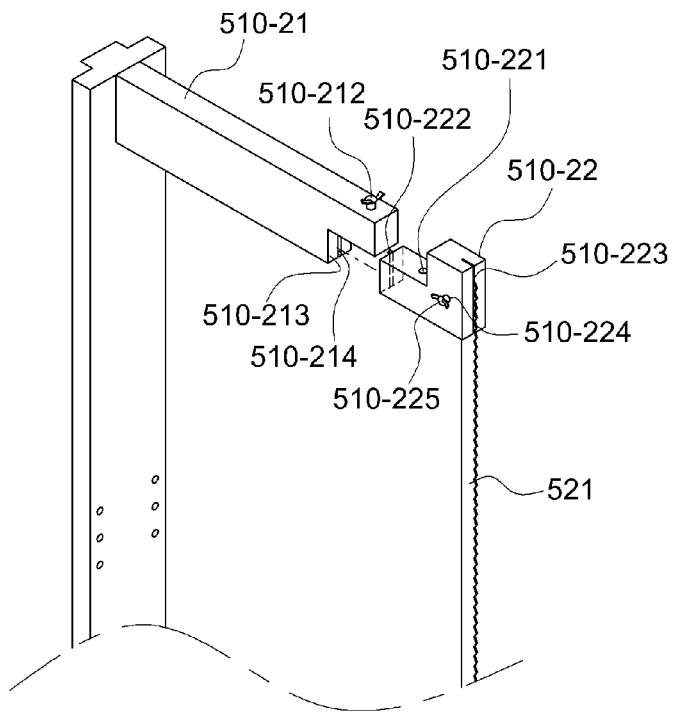

According to a second example of the coupling body 510-22, as shown in FIG. 17, the lower portion of the left side of the coupling body 510-22 is protruded to an 'L'like shape.

At this time, the coupling body 510-22 includes the fastening hole 510-221 formed on the lower portion of the left side thereof, the guide bar 510-222 formed on one surface contacted with the cut wall 510-213 of the body 510-21 in such a manner as to be inserted into the guide groove 510-214 of the cut wall 510-213, the saw blade groove 223 formed on the other surface thereof, and the coupling hole 510-224 piercedly formed on both side surfaces thereof in such a manner as to be fastened to the coupling bolts 510-225.

In the same manner as above, if the fastening bolt 510-212 is fastened to the fastening hole of the body 510-21 and the fastening hole 510-221 of the coupling body 510-22, the upward and downward movements of the coupling body 510-22 are guided by means of the guide bar 510-222 slidingly moving along the guide groove 510-214, and the tension of the hacksaw blade 521 is adjusted in accordance with the degree of fastening of the fastening bolt 510-212.

Figure 18:
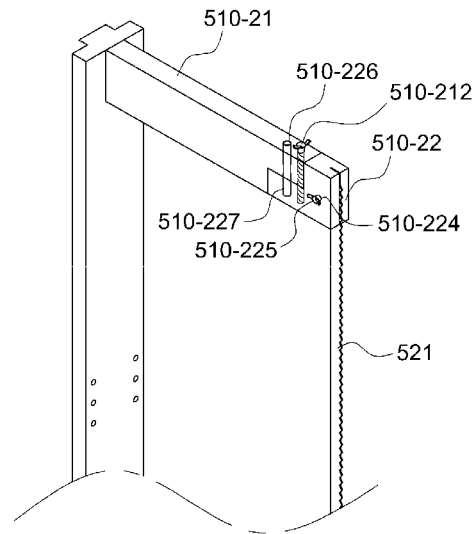

According to a third example of the coupling body 510-22, as shown in FIG. 18, the coupling body 510-22 includes a fixing hole 510-226 piercedly formed on the protruding portion of the upper portion of the right side of the body 510-21 and on the protruding portion of the lower portion of the left side of the coupling body 510-22 and a fixing bar 510-227 inserted into the fixing hole 510-226 to guide the upward and downward movements of the coupling body 510-22.

At this time, if the fastening bolt 510-212 is fastened to the fastening hole of the body 510-21 and the fastening hole 510-221 of the coupling body 510-22, the upward and downward movements of the coupling body 510-22 are guided by means of the fixing bar 510-227, and the tension of the hacksaw blade 521 is adjusted in accordance with the degree of fastening of the fastening bolt 510-212.

Of course, at this time, the guide groove 510-214 formed on the cut wall 510-213 of the body 510-21 and the guide bar 510-222 formed on one surface of the coupling body 510-22 contacted with the cut wall 510-213 of the body 510-21 may be removed from the components of the body 510-21 and the coupling body 510-22.

Figure 19:
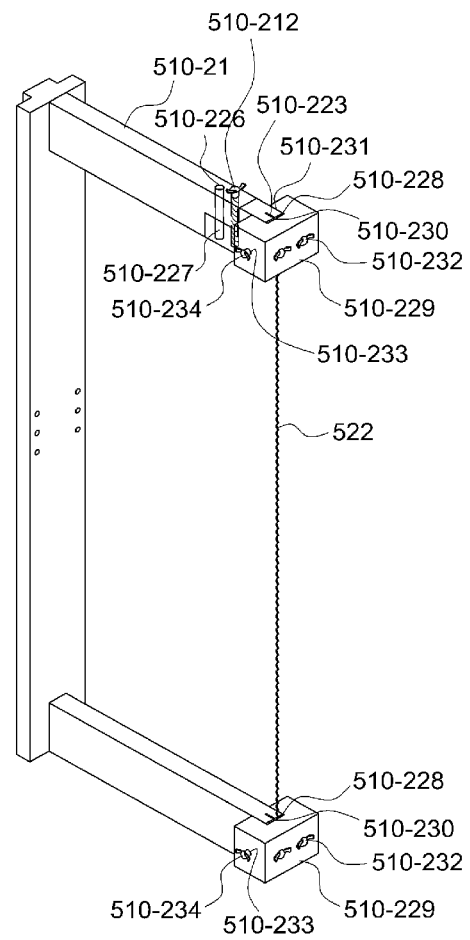

According to a fourth example of the coupling body 510-22 wherein the fretsaw blade 522 is employed, as shown in FIG. 19, the coupling body 510-22 includes a fretsaw blade coupling plate 510-228 attached to the other surface of the coupling body 510-22 of the upper frame 510-2 and a cover 510-229 coupled to the fretsaw blade coupling plate 510-228 and further includes the fretsaw blade coupling plate 510-228 attached to the other surface of the lower frame 510-3 and the cover 510-229 coupled to the fretsaw blade coupling plate 510-228, so that the fretsaw blade 522 is coupled to the fretsaw blade fixing grooves 510-230.

At this time, the fretsaw blade coupling plate 510-228 is formed of a rectangular piece of iron having the fretsaw blade fixing groove 510-230 formed vertically on the center portion thereof and fastening holes piercedly formed on the left and right sides of the front surface thereof, and the cover 510-229 having a 'C'-like shape is adapted to surround the other surface of the coupling body 510-22 of the upper frame 510-2 or the other end portion of the lower frame 510-3, while having fastening holes piercedly formed on both sides of the center of the front surface thereof in such a manner as to be fastened to cover fastening bolts 510-232 and coupling holes 510-233 piercedly formed on the left and right side surfaces thereof in such a manner as to be fastened to coupling bolts 510-234.

Figure 20:
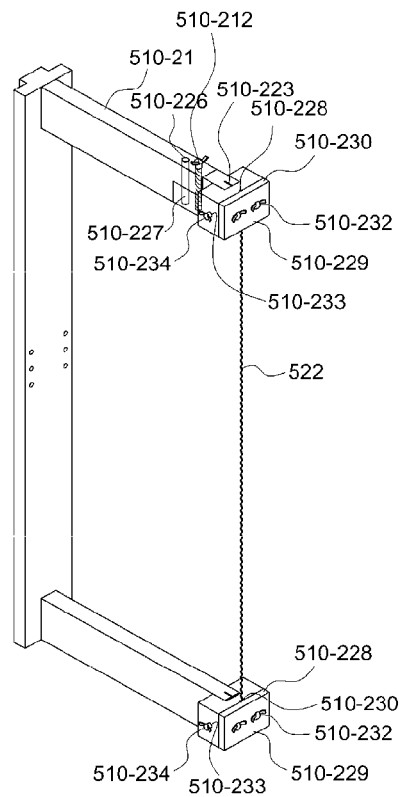
Figure 21:
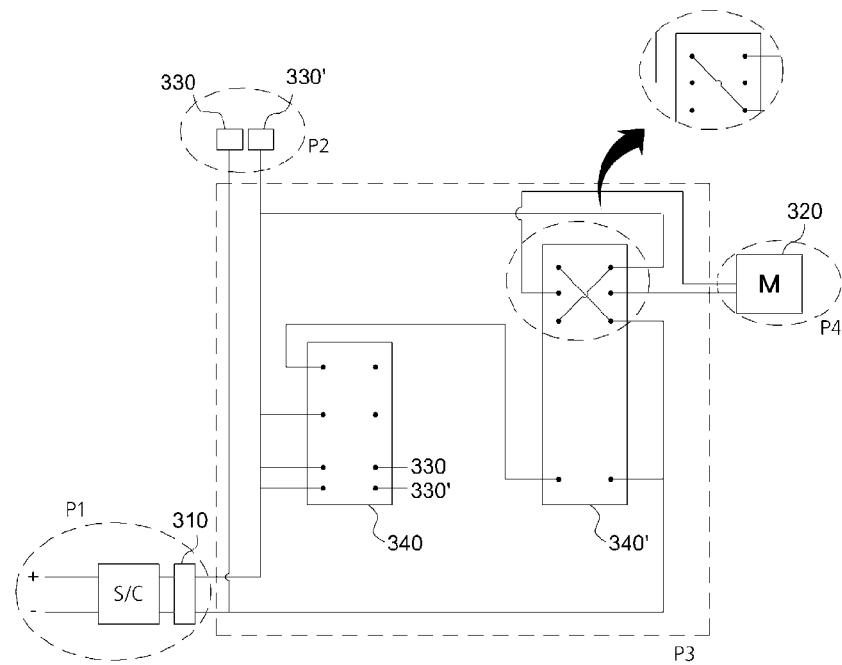
FIG. 21 is a diagram showing a forward and reverse rotation driving part in the electric saw according to the present invention.

At this time, as shown in FIG.20, the cover 510-229 having the 'C'-like shape is adapted to surround the other surface of the coupling body 510-22 of the upper frame 510-2 or the other end portion of the lower frame 510-3 is first coupled, and next, the rectangular fretsaw blade coupling plate 510-228 having the rectangular size of the front surface of the cover 510-229 is fastened to the external surface of the cover 510-220 by means of fastening bolts. In this case, the fretsaw blade coupling plate 510-228 is formed of a rectangular piece of iron having the fretsaw blade fixing groove 510-230 formed vertically on the center portion thereof and fastening holes piercedly formed on the left and right sides of the front surface thereof.

In the same manner as above, if the fastening bolt 510-212 is fastened to the fastening hole of the body 510-21 of the upper frame 510-2 and the fastening hole 510-221 of the coupling body 510-22, the upward and downward movements of the coupling body 510-22 are guided by means of the fixing bar 510-227, and the tension of the fretsaw blade 522 is adjusted in accordance with the degree of fastening of the fastening bolt 510-212.

According to the first embodiment of the present invention, if the wheel 420 coupled to the motor shaft of the DC motor 320 rotates forwardly and reversely in accordance with the forward and reverse rotation of the DC motor 320, the wire 430, which is tied up on both ends thereof to the body of the wheel 420, is guided by the wire grooves 421 and 421' formed on the periphery of the body of the wheel 420, so that one end wire is turned around the upper roller 413 and the other end wire is turned around the lower roller 413' in such a manner as to pull and unwind each other, thus moving up and down the elevator 440 to allow the saw part 500 coupled to the elevator 440 to be moved up and down to cut the target object.

According to the second embodiment of the present invention, if the lower belt pulley 620' coupled to the motor shaft of the DC motor 320 rotates forwardly and reversely in accordance with the forward and reverse rotation of the DC motor 320, the timing belt 630, which is coupled to the upper and lower belt pulleys 620 and 620', is rotated forwardly and reversely in upward and downward directions, thus moving up and down the elevator 640 coupled movable up and down to the guides 616 and 616' fixed to the front surface of the frame 610 to allow the saw part 500 coupled to the elevator 640 to be moved up and down to cut the target object.

As described above, the electric saw according to the present invention has the following advantages: it is operated by electrical reciprocating motions to allow women or young adults to cut the target object safely and easily; it generates low noise upon cutting; it is useful to cut a material like metal or synthetic resin as well as wood; it cuts the cutting surface at an oblique angle if necessary; it easily cuts the target object along a curved line; and it incises the center area of the target object to a given shape.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electric saw, comprising:
    a body;
    a base fixedly coupled to the center of traverse stands of the body to fix a frame of an elevating motion converting part thereto;
    a forward and reverse rotation driving part adapted to drive forward and reverse rotation of a DC motor under the control of first and second relay switches alternately connected by means of upper and lower sensors;
    the elevating motion converting unit adapted to allow a wire wound on a wheel to be turned around upper and lower rollers and to move up and down an elevator insertedly coupled movable up and down to left and right guides of the frame, when the wheel coupled to a motor shaft of the DC motor rotates forwardly and reversely according to the forward and reverse rotation of the DC motor; and
    a saw part having a 'C'-like shaped saw frame having a fixing frame adapted to fix one end of an upper frame to the upper end thereof and to fix one end of a lower frame to the lower end thereof and a plurality of elevator coupling holes formed on the intermediate area thereof, the upper frame adapted to fix the upper end of a saw blade to the other end thereof, and the lower frame adapted to fix the lower end of the saw blade to the other end thereof, and the saw blade fixed on both ends thereof to the other end of the upper frame and to the other end of the lower frame.

2. The electric saw according to claim 1, wherein if the wheel coupled to the motor shaft of the DC motor rotates forwardly and reversely in accordance with the forward and reverse rotation of the DC motor, the wire, which is tied up on both ends thereof to a body of the wheel, is guided by wire grooves formed on the periphery of the body of the wheel, so that one end wire is turned around the upper roller and the other end wire is turned around the lower roller in such a manner as to pull and unwind each other, thus moving up and down the elevator to allow the saw part coupled to the elevator to be moved up and down to cut a target object.

3. The electric saw according to claim 1, wherein the elevating motion converting unit comprises:
    the frame having a front frame having fixing blocks fixed to both sides of the upper and lower portions of the front surface thereof and a rear frame located behind the front frame in such a manner as to be connected on the top portion thereof to the front frame by means of a top frame and connected on the intermediate portion thereof to the front frame by means of a motor coupling panel, the front frame and the rear frame being formed unitarily with each other;
    the wheel coupled to the motor shaft protruding from the other side of the motor coupling panel by means of at least one or more bolts;
    the wire tied up to the wheel in such a manner as to be turned around the upper and lower rollers and to fix the elevator thereto; and the elevator insertedly coupled movable up and down to the left and right guides fixed to the front surface of the front frame in such a manner as to be fixed to the wire.

4. The electric saw according to claim 3, wherein the wheel has a shape of a disc and comprises two wire grooves formed in parallel to each other along the periphery thereof in such a manner as to be extended to two wire knot holes formed on a body thereof along the respective peripheral surfaces thereof and knot rods disposed on the wire knot holes.

5. The electric saw according to claim 3, wherein the wire is tied up on both ends thereof to the knot rods disposed on the wire knot holes formed on the body of the wheel, so that one end wire is turned around the upper roller and the other end wire is turned around the lower roller along the respective wire grooves at the same time, thus fixedly coupling the elevator coupled movable up and down to the left and right guides fixed to the front surface of the front frame thereto.

6. The electric saw according to claim 1, wherein the elevating motion converting unit comprises:
- a frame having a shape of a panel and comprising upper and lower roller protruding holes formed on the top end portion and the lower portion thereof, upper and lower sensor coupling holes formed on given positions of the upper and lower portions thereof, a shaft coupling hole formed on the lower end portion thereof, a plurality of frame coupling holes formed along the periphery of the shaft coupling hole, and guide fixing members fixed to the left and right sides of the upper and lower portions of the front surface thereof;
- upper and lower belt pulleys coupled rotatably to pulley coupling holes formed on the center portions of upper and lower pulley fixing walls formed on the upper and lower portions of the back surface of the frame in such a manner as to protrude from the front surface of the frame;
- a timing belt having equally spaced grooves formed on the inner surface thereof in such a manner as to be accurately engaged with grooves formed on the upper and lower belt pulleys; and
- an elevator adapted to fix both ends of the timing belt thereto in such a manner as to be coupled movable up and down to guides fixed to the front surface of the frame.

7. The electric saw according to claim 6, wherein if the lower belt pulley coupled to the motor shaft of the DC motor rotates forwardly and reversely in accordance with the forward and reverse rotation of the DC motor, the timing belt, which is coupled to the upper and lower belt pulleys, is rotated forwardly and reversely in upward and downward directions, thus moving up and down the elevator coupled movable up and down to the guides fixed to the front surface of the frame to allow the saw part coupled to the elevator to be moved up and down to cut the target object.

8. The electric saw according to claim 1, wherein the upper frame is separated into a body and a coupling body, the body being cut by a given width to a shape of a rectangular parallelepiped on the lower portion of one end thereof and having a fastening bolt disposed on the top portion thereof and a guide groove formed vertically on the center portion of a cut wall formed by the cutting, and the coupling body has an upside down 'L'-like shape from a side of the coupling body, and comprising a fastening hole formed on the top portion thereof, a guide bar formed on one surface contacted with the cut wall of the body in such a manner as to be inserted into the guide groove of the cut wall, a saw blade groove formed on the other surface thereof, and a coupling hole piercedly formed on both side surfaces thereof in such a manner as to be fastened to coupling bolts.

9. The electric saw according to claim 1, wherein the upper frame is separated into a body and a coupling body, the body being cut by a given width to a shape of a rectangular parallelepiped on the lower portion of one end thereof and having a fastening bolt disposed on the top portion thereof and a guide groove formed vertically on the center portion of a cut wall formed by the cutting, and the coupling body having a 'L'-like shape from a side of the coupling body, and comprises a fastening hole formed on the lower portion of the left side thereof, a guide bar formed on one surface contacted with the cut wall of the body in such a manner as to be inserted into the guide groove of the cut wall, a saw blade groove formed on the other surface thereof, and a coupling hole piercedly formed on both side surfaces thereof in such a manner as to be fastened to coupling bolts.

10. The electric saw according to claim 9, wherein the coupling body comprises a fixing hole piercedly formed on the protruding portion of the upper portion of the right side of the body and on the protruding portion of the lower portion of the left side of the coupling body and a fixing bar inserted into the fixing hole.

11. The electric saw according to claim 10, wherein the coupling body comprises a fretsaw blade coupling plate attached to the other surface thereof and a cover coupled to the fretsaw blade coupling plate and further comprises the fretsaw blade coupling plate attached to the other surface of the lower frame and the cover coupled to the fretsaw blade coupling plate, so that a fretsaw blade is coupled to the fretsaw blade fixing grooves.

12. The electric saw according to claim 11, wherein the cover is coupled to the other surface of the coupling body of the upper frame or to the other end portion of the lower frame, and the rectangular fretsaw blade coupling plate having the rectangular size of the front surface of the cover is fastened to the external surface of the cover, so that the fretsaw blade is coupled to the fretsaw blade fixing grooves.

* * * * *